United States Patent
Ortega et al.

(10) Patent No.: US 9,080,904 B2
(45) Date of Patent: Jul. 14, 2015

(54) SYSTEM AND METHOD FOR THE REAL-TIME MEASUREMENT OF A FLOW OF DISCHARGE MATERIAL FROM A MINERAL-GRINDING MILL

(71) Applicant: Universidad de Santiago de Chile, Santiago (CL)

(72) Inventors: Luis Magne Ortega, Santiago (CL); Gilda Titichoca Aguirre, Santiago (CL); Eduardo Altamirano Cabrera, Santiago (CL)

(73) Assignee: Universidad de Santiago de Chile (CL)

( * ) Notice: Subject to any disclaimer, the term of this patent is extended or adjusted under 35 U.S.C. 154(b) by 169 days.

(21) Appl. No.: 13/920,774

(22) Filed: Jun. 18, 2013

(65) Prior Publication Data

US 2013/0276548 A1  Oct. 24, 2013

Related U.S. Application Data

(63) Continuation of application No. PCT/IB2011/055996, filed on Dec. 28, 2011.

(51) Int. Cl.
| | |
|---|---|
| G01F 1/56 | (2006.01) |
| B02C 17/00 | (2006.01) |
| B02C 17/18 | (2006.01) |

(52) U.S. Cl.
CPC .............. *G01F 1/56* (2013.01); *B02C 17/1805* (2013.01); *B02C 17/1835* (2013.01)

(58) Field of Classification Search
None
See application file for complete search history.

(56) References Cited

U.S. PATENT DOCUMENTS

| | | | |
|---|---|---|---|
| 3,253,744 A | 5/1966 | MacPherson et al. | |
| 5,360,174 A | 11/1994 | Persson | |
| 5,679,906 A * | 10/1997 | Van Cleve et al. | ....... 73/861.353 |
| 5,698,797 A | 12/1997 | Fontanille et al. | |
| 6,874,364 B1 | 4/2005 | Campbell et al. | |
| 2001/0029789 A1 * | 10/2001 | Soderholm et al. | ...... 73/861.351 |
| 2002/0033425 A1 | 3/2002 | Sellars | |

FOREIGN PATENT DOCUMENTS

WO  2012090173 A1  7/2012

OTHER PUBLICATIONS

PCT "International Search Report" on May 30, 2012 for International Application No. PCT/IP2011/055996, WO 2012/090173 published Jul. 5, 2012 of Universidad de Santiago de Chile.

* cited by examiner

*Primary Examiner* — Harshad R Patel
(74) *Attorney, Agent, or Firm* — Tolpin & Partners, PC; Thomas W. Tolpin

(57) ABSTRACT

A system and a method is provided to measure the material discharge from a mill for grinding one in a real time. The system includes at least a strain gage located on at least one insert positioned in a pulp lifter or discharge cone. The strain gage is connected to an adaptor unit. A wireless transmitter is connected to the adaptor unit to transmit signals from the strain gage to a wireless receiver. A signal reader is connected to the wireless receiver to process the signal.

14 Claims, 9 Drawing Sheets

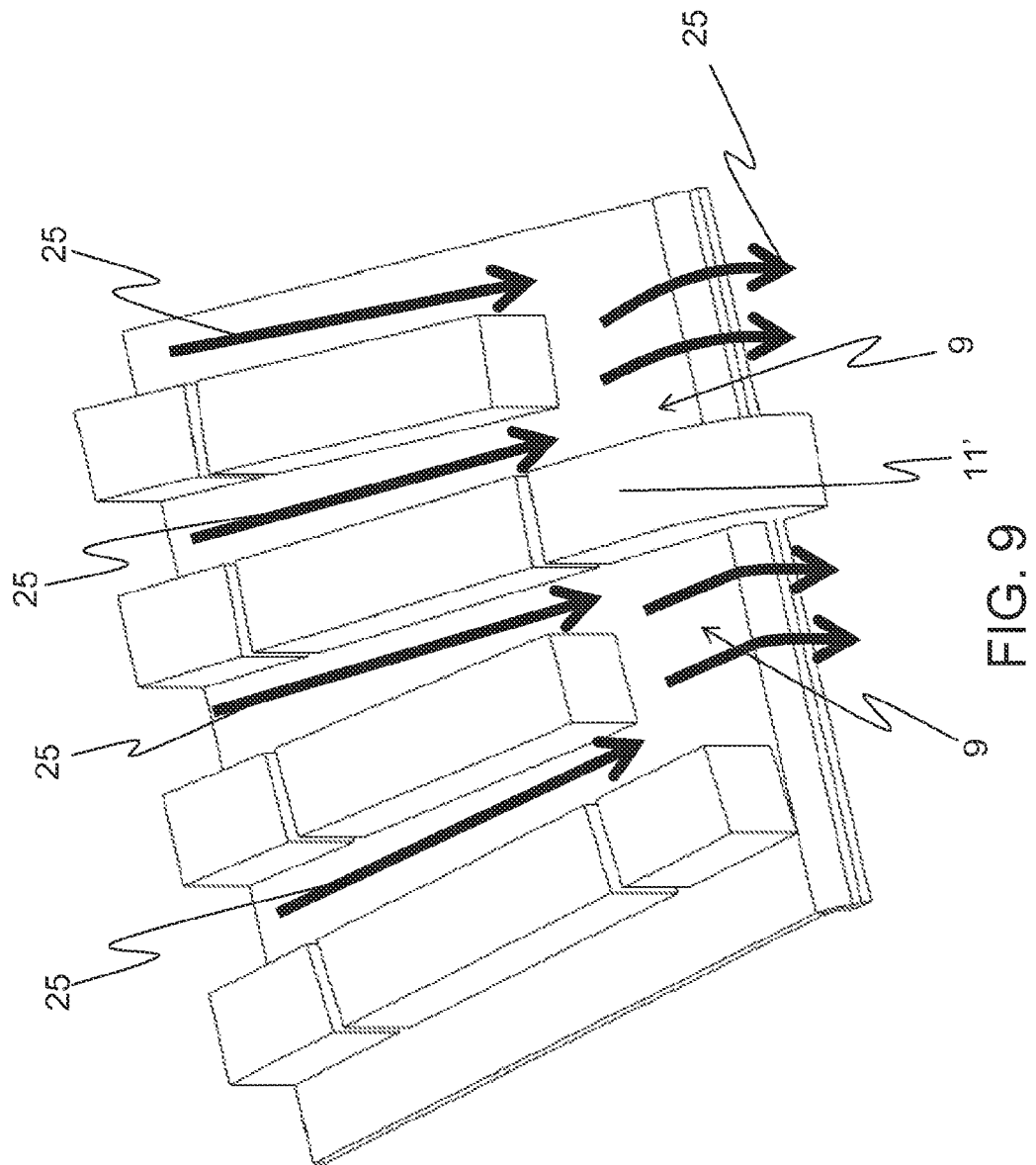

SYSTEM AND METHOD FOR THE REAL-TIME MEASUREMENT OF A FLOW OF DISCHARGE MATERIAL FROM A MINERAL-GRINDING MILL

TECHNICAL FIELD OF THE INVENTION

The present invention relates to a system to monitor the flow of material that passes through the discharge bins (also known as pulp lifters) and the discharge cone in Autogenous (AG) and Semi-Autogenous (SAG) mills for grinding ores while the mill is in operation.

BACKGROUND OF THE INVENTION

During the operation of a AG or SAG mills, the ore is ground in the milling chamber, where when reaching the desired size, passes along with the water for the process, through the slots in the discharge grate which is part of the discharge cover. Once the material crosses through the grate, its build-up in the pulp lifter, flowing while the mill rotates toward the discharge cone located in the middle position of the discharge cover where it exhausts the mill. The design of the pulp lifter and/or the discharge cone can produce the excessive clogging in the flow of the material exiting the mill or the greater size particles might obstruct the exit. In both cases, the flow of the discharge decreases, the material remains in the pulp lifter and the material that can exit from the inside of the mill can not do so, thus producing overload in the equipment, decreasing the processing capacity of the mill and generating significant production losses. Generally it is not possible to clearly identify these deficiencies during the process whereas the mill operator modifies the operational variables until partially or totally resolving the issue. In some cases, the solution is not achieved by modifying the operational variables, being possible to identify the issue only through stopping the mill, which leads to greater production losses.

This is the reason there is a need for some type of system allowing measuring the flow of material consistently discharged, in real time, as to determine what is happening both inside the pulp lifter and the discharge cone as to monitor said flow. Information in such way obtained would allow the operator to have a new control variable as to address in the most effective manner the operational conditions producing a lower discharge flow from the mill or to identify what are the conditions in the design producing the conditions of operational loss (while these components meet their life cycle, they are subject to wearing by abrasion from contact with the flow of material going through thereof, thus modifying its design).

A number of attempts had been made in the state of the art aiming to provide real-time monitoring of the conditions under which the milling is being done while the mill is under operation. For example, in U.S. Pat. No. 6,874,364 (Campbell et al.) published on Apr. 5, 2005, discloses a system to monitor mechanical waves in a machine that has particles in motion when in operation, wherein the system includes at least a sensor located in the machine at a distal location from the central axis of the machine, and the sensors are designed to detect acoustic waves and include a transmitter to transmit signals representing the mechanical waves detected to a receiver located in a remote location from the sensor(s), a data processor connected to the receiver to receive signal from the receiver representing the mechanical waves and to process signals as to produce output signals for further visualization in a screen, where the output signals represent one or more parameters indicative of the mechanical waves produced by the machine during a specific period of time.

Document U.S. Pat. No. 5,698,797 (Fontanille et al.) published on Dec. 16, 1997, discloses a monitoring device for a ball mill which has a group of balls arranged, during the rotation of the mill at a normal speed, between two generators (lb, lb) separated to a minimum angle ($\alpha$) and a maximum angle and a mass of coal arranged during the rotation of the mill at a normal speed between two generator (lc, lc) separated in an angle ($\beta$), and which consists of a wave transmitter, waves selected from between the electromagnetic waves, wherein said transmitter can be arranged within the mill, and receiver means for such waves, wherein said receiver means are connected to an electronic circuit to determine the parameters corresponding to the number of balls, the amount of coal, and the wearing of the cover, where such means can be arranged in the external part of the mill in such a way that they can detect the waves crossing a generator lb and the waves in the external part of the maximum angle sections and $\beta$, as to determine the wearing of the cover; and that they can detect the waves in the angle section $\beta$ not common to the angle section in order to determine the amount of coal. The wave receiver means are arranged in a rotational manner around the longitudinal axis of the cover in an angle section above the angle section encompassing $\alpha$ and $\beta$. 3. In this system the transmitter is located in the longitudinal axis of the cover whereas such transmitter is a gamma-ray photon type transmitter. The electronic circuit to determine the number of balls include, for each generator (lb, lb), one converter and one lineariser, wherein the signals from each lineariser are associated as to calculate the number of balls. The electronic circuit to determine the wearing in the case consists of a converter connected to a device to read the degree of wearing.

Document DE 4215455 (Godler) published Nov. 18, 1993, discloses a system with sensors for sound signals produced as a response to the noise generated by the milling plant, signals that are then analyzed as to render a measurement value of the status of operation of the plant. The status of the operation is measured as per the level of the mill. In order to analyse the noise, the system creates a noise spectrum and includes a device for a fast Fourier transformation. It also includes a device that creates the average of the spectrum during a long period of time. This system allows determining the performance of the mill, particularly a mill for rocks, in order to improve it and to improve the quality of the processed material.

The three documents described above disclose methods and apparatus that detect noise and make the correlation of said noise as to determine some of the operation properties. However, none of these teaches how to consistently measure the flow, in real time, as to determine what is happening both inside the pulp lifter and the discharge cone as to monitor said flow.

BRIEF SUMMARY OF THE INVENTION

Based on the above the object of the invention is to provide a monitoring system allowing measuring the flow of material in the pulp lifter and the discharge cone of an Autogenous and Semi-Autogenous mill.

A more detailed explanation of the invention is provided in the following detailed descriptions and appended claims taken in conjunction with the accompanying drawings.

BRIEF DESCRIPTION OF DRAWINGS

The drawings herein, which are included as to provide better understanding of the invention, are an integral part of the description and also illustrate part of the previous art as well as some of the preferred embodiments and are used as a way of explanation of the principles of the invention.

FIG. 9 shows a schematic perspective of the flow of the material in the discharge cone.

DETAILED DESCRIPTION OF THE INVENTION

The following is a detailed description and explanation of the preferred embodiments of the invention and best modes for practicing the invention.

The present invention relates to a real time measuring system of the flow of material that passes through the pulp lifters and the discharge cone of an Autogenous or Semi-Autogenous mill for grinding of mineral.

Figure 1:
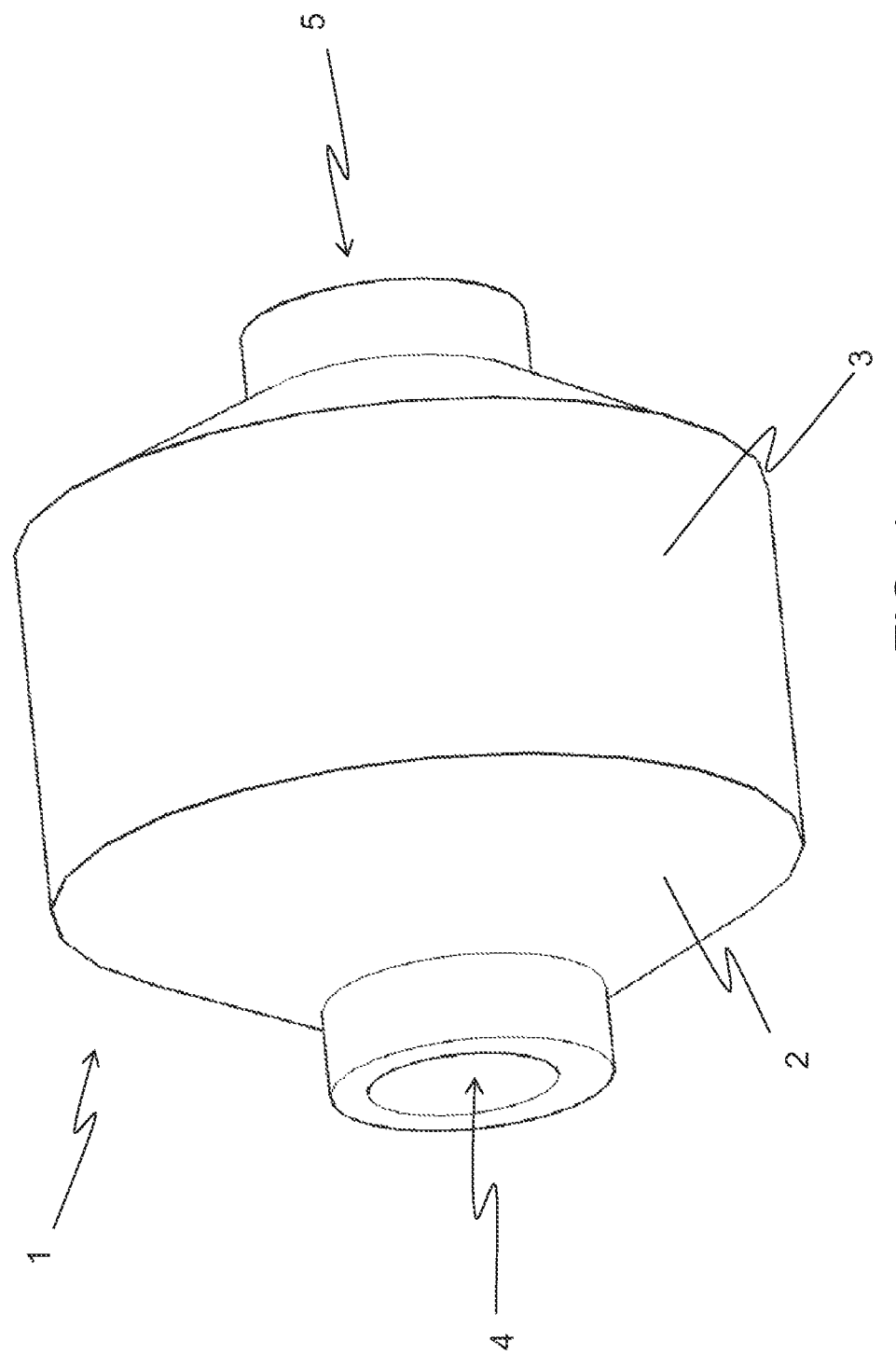
FIG. 1 shows a perspective view from the outside of an Autogenous or -Semi-Autogenous mill for grinding mineral.

FIG. 1 shows an external perspective view of an Autogenous or -Semi-Autogenous mill for grinding mineral. Said mill (1) consists of a cover or cylinder (3), a feeding lid, and a discharge cover (2), a discharge or exit outlet for the material (also known as discharge trunnion) (4) and a feed inlet (5) to accept the material entering (feed trunnion).

Figure 2:
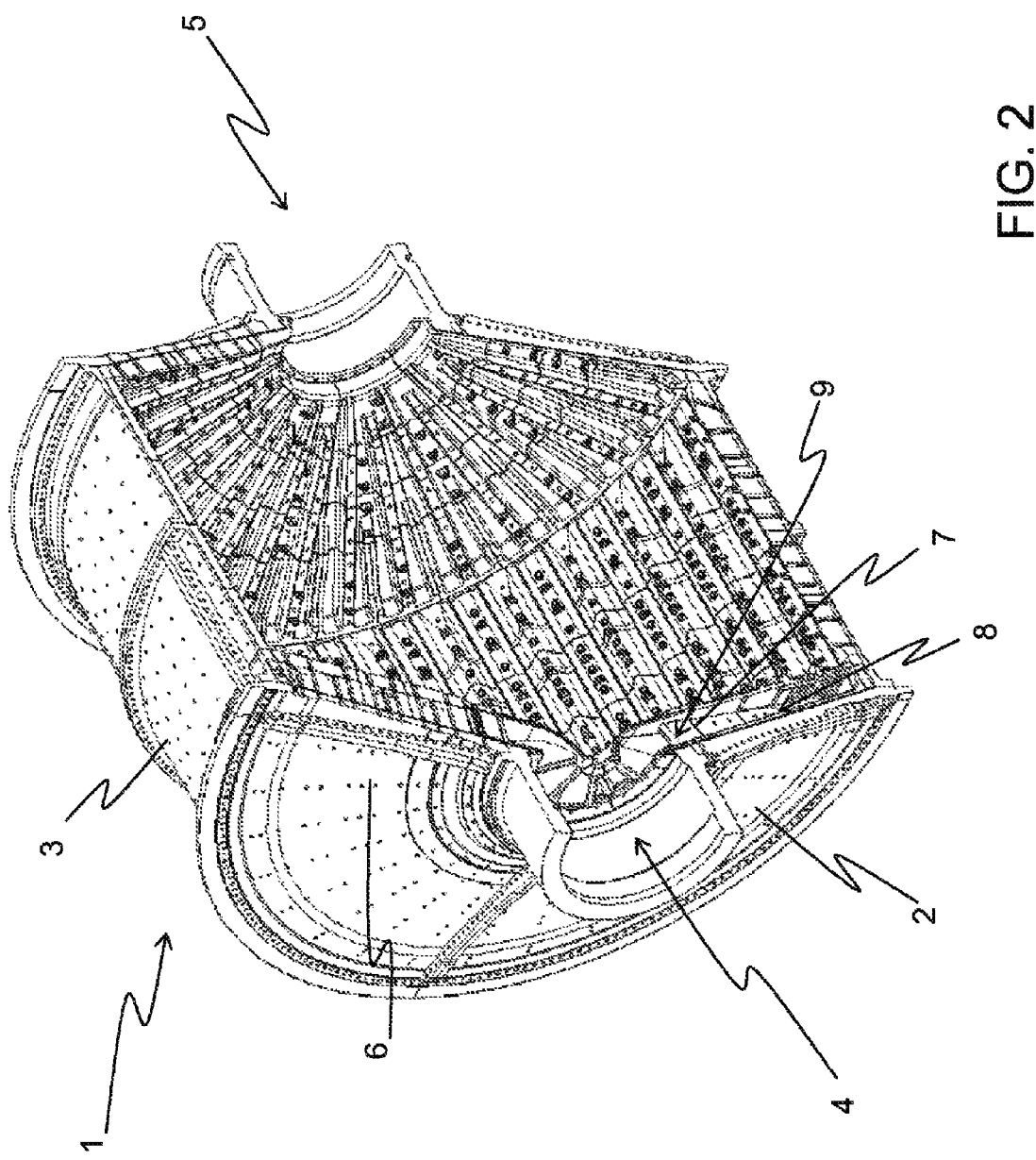
FIG. 2 shows a cross-section view of an Autogenous or Semi-Autogenous mill, illustrating the grate, the pulp lifter, the discharge cone, the cover, the fitting screws of the liners and components.
Figure 3:
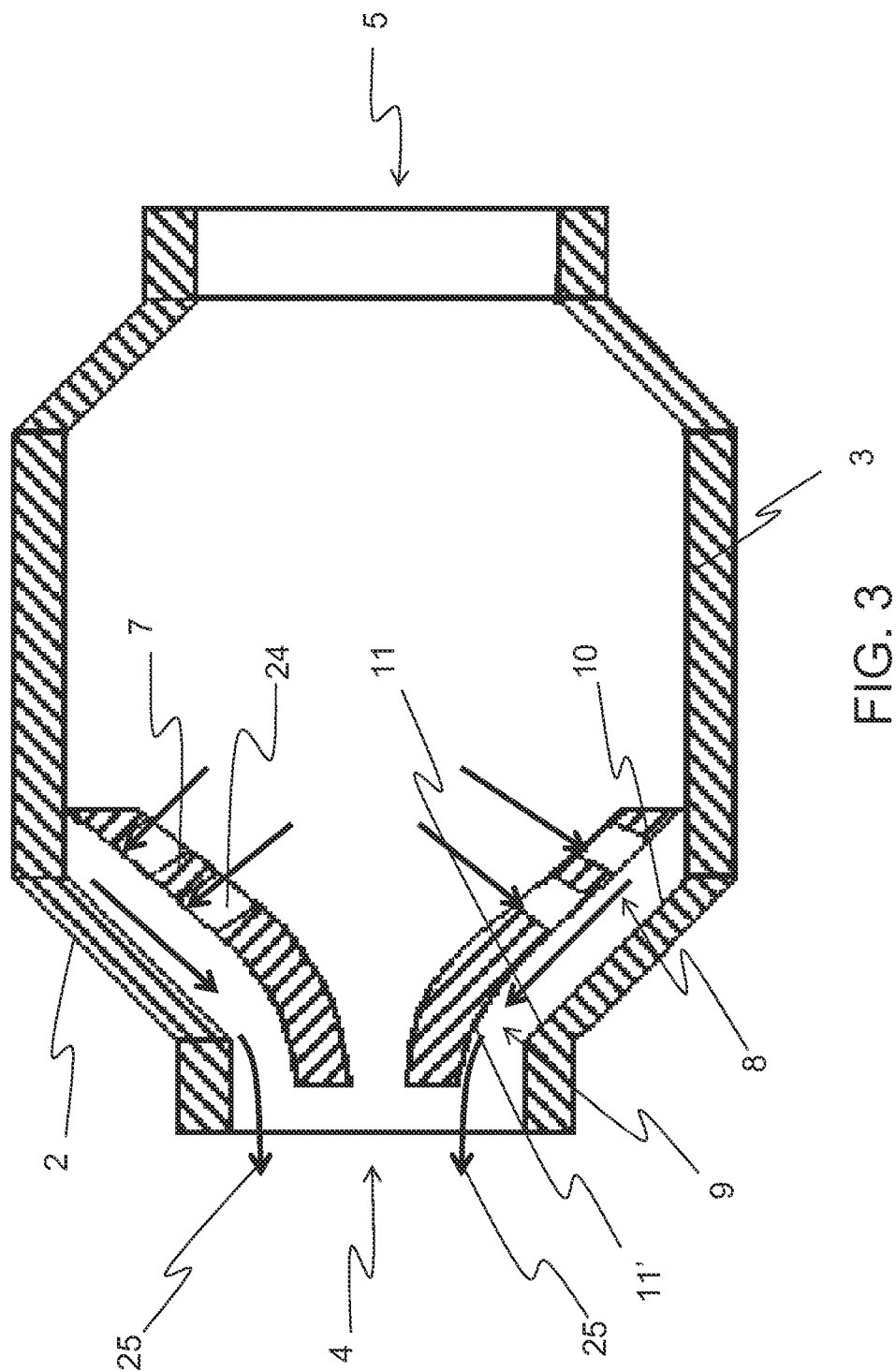
FIG. 3 shows as schematic, cross-section view of an Autogenous or -Semi-Autogenous mill for grinding mineral.

FIG. 1 is a cross-section of the mill (2) in FIGS. 2-3, showing liners and lifting elements, which allow that both the ore and the balls rotate (in the case of a Semi-Autogenous mill), lifting the material up and around thus producing the grinding of the material which enters the opening (5) and which goes out through the exit port (4). Within the mill and close to the exit port (4) the internal grate (7) is located, wherein slots (24) are located thereof that facilitate the passage of the mineral when the mineral reaches the appropriate size, crossing through said slots (24) toward the pulp lifter (8) and passing through the discharge cone (9) until reaching the exit port (4). The assembly consisting of the internal grate (7), pulp lifter (8), and discharge cone (9) is affixed to the discharge cover (2) of the mill (1) by mean of screws (6).

Figure 5:
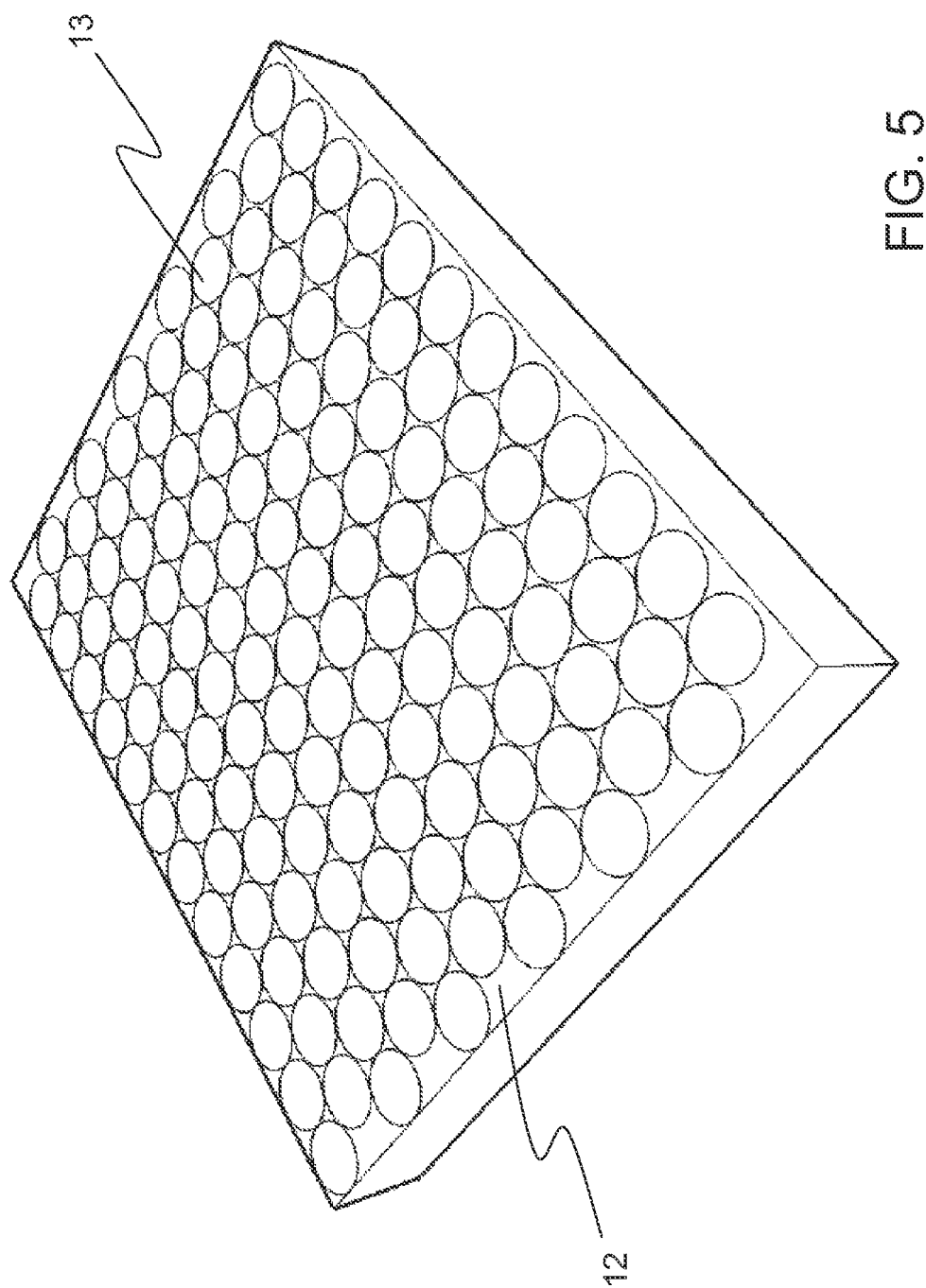
FIG. 5 shows a perspective view of the liner components from the walls in the pulp lifter and the discharge cone made of ceramic inserts in rubber (there are inserts totally fabricated from metal).

In some cases the walls of both pulp lifter (8) and discharge cone (9) are made up of rubber (12) that includes a plurality of ceramic inserts (13) thereof as shown in FIG. 5. In other cases, each of these components is made of metal (Manganese steel).

Figure 4:
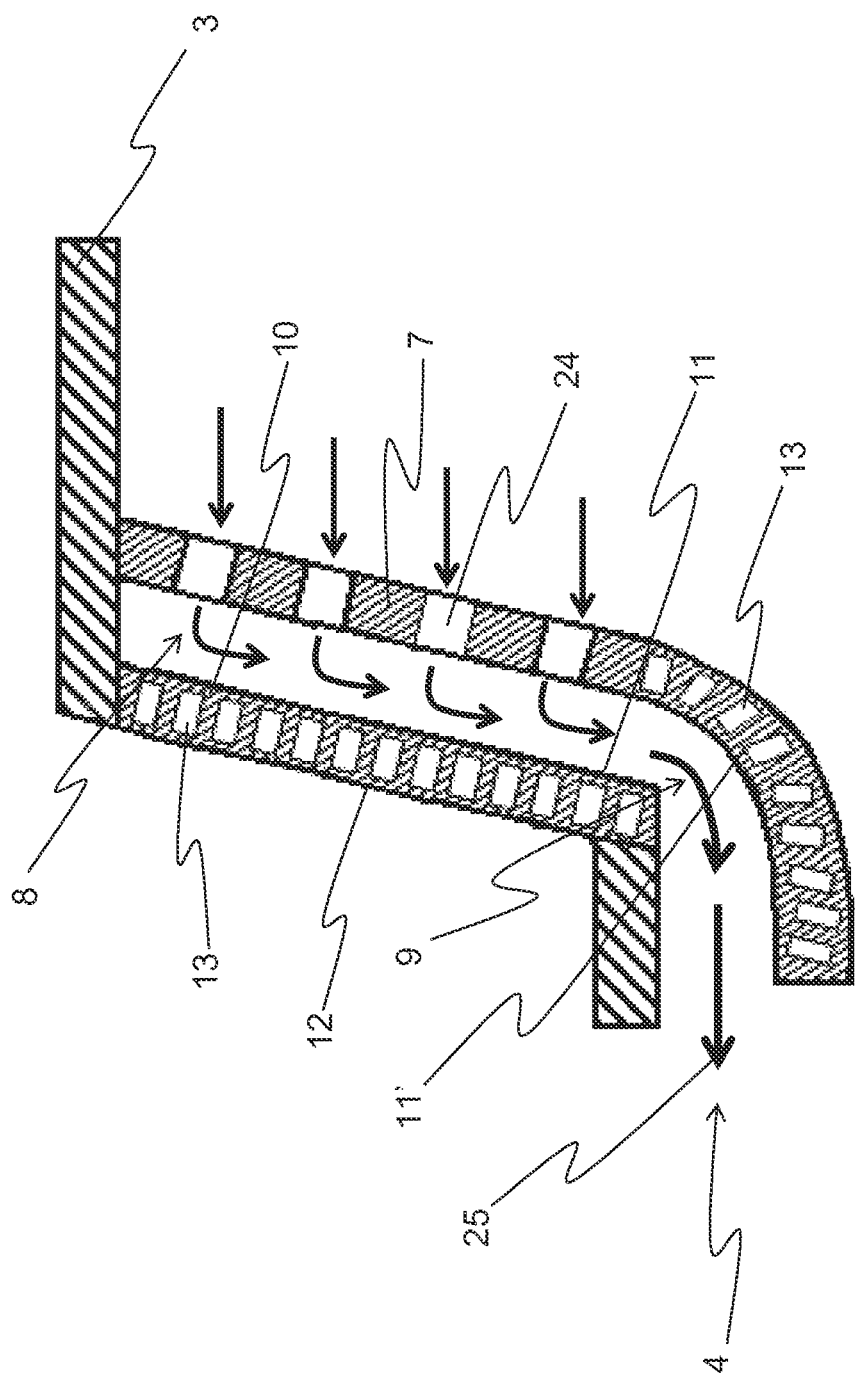
FIG. 4 shows a schematic, cross-section view of the flow of material flowing from within the mill to the discharge cone.

As shown in FIG. 4, when the flow of material (25) passes through the slots (24) of the grate(7), the flow runs through the pulp lifter (8), exercising pressure over the surface (10) of said pulp lifter (8) as a result of the flow of material passing toward the discharge cone (9). The same situation occurs with the discharge cone (9), whereas the surfaces (11, 11') receive the pressure from the flow of material (25) passing to the outlet of the mill (4), due to the fact that also the exit areas are restricted by the geometry of the system. Inside the rubber (12) ceramic or metal inserts (13) are placed as to reinforce and improve the resistance to abrasion in the walls of the pulp lifter (8) and the discharge cone (9), as shown in FIG. 5.

Figure 6:
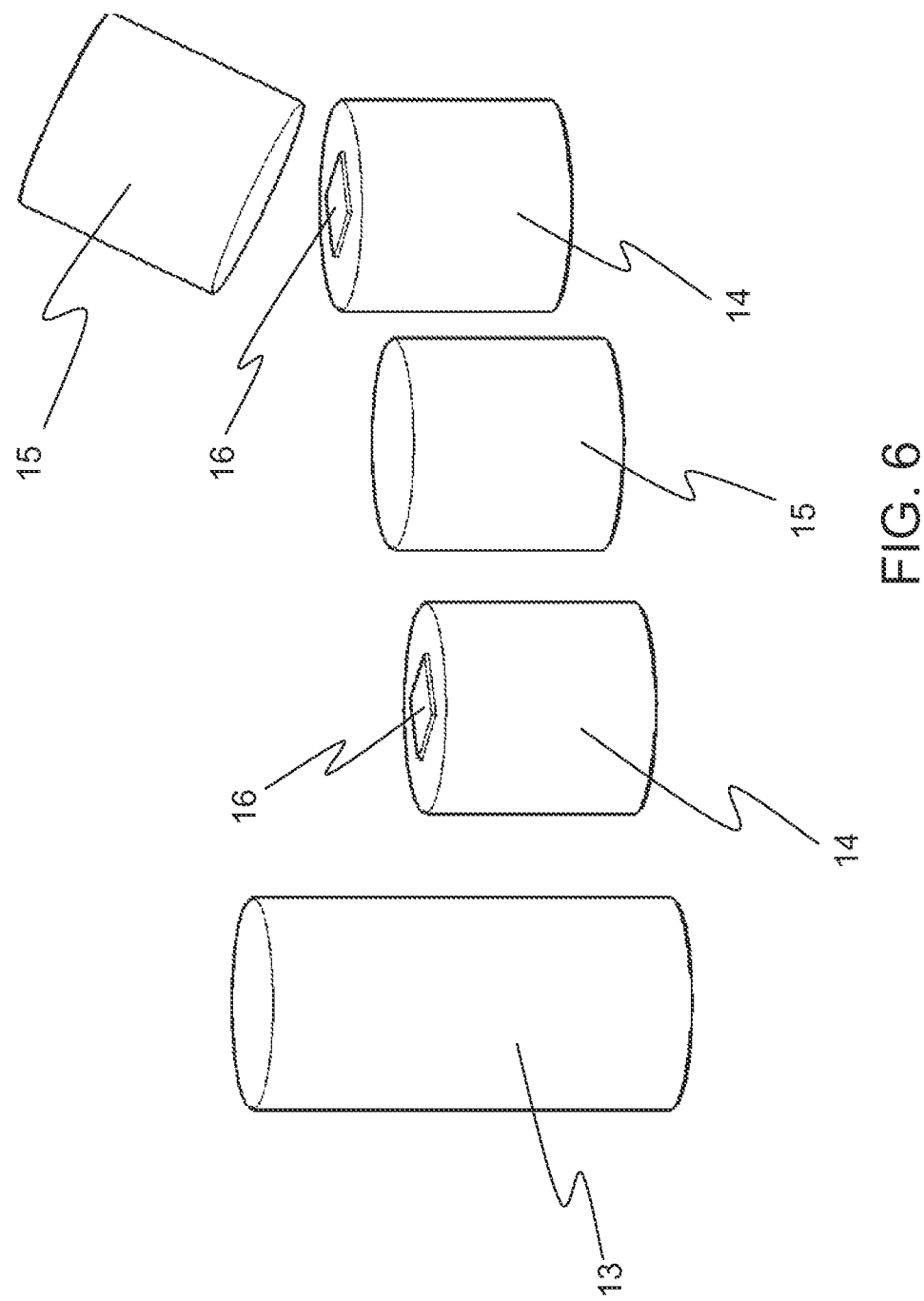
FIG. 6 shows a perspective view of the ceramic cylinders inserted in the wall liners of the pulp lifter and the discharge cone as well as one of such cylinders in half wherein the strain gage is located.

A ceramic insert (13) is cross-sectioned in its middle part as to measure and monitor the discharge of the material, thus being divided in a lower half (14) and an upper half (15). The surface created by the cross-section has attached thereof a strain gage (16), as shown in FIG. 6. The halves (14, 15) are attached again as to make up an insert (13), ceramic or metallic, which holds a sensor inside allowing determining the stress received by the surfaces (10) of the pulp lifter (8) and/or on the surfaces (11,11') of the discharge cone (9).

This insert (13) with the strain gage (16) is placed within the rubber (12), in any of the walls of the discharge cone (9), either on the surface of the external covering layer (11) or the surface of the internal covering layer (11') or in both. The insert (13) with the strain gage (16) can also be placed on the covering surface (10) of the pulp lifter (8). The system can include several inserts (13) consisting of strain gages (16) placed on the locations above mentioned.

Figure 7:
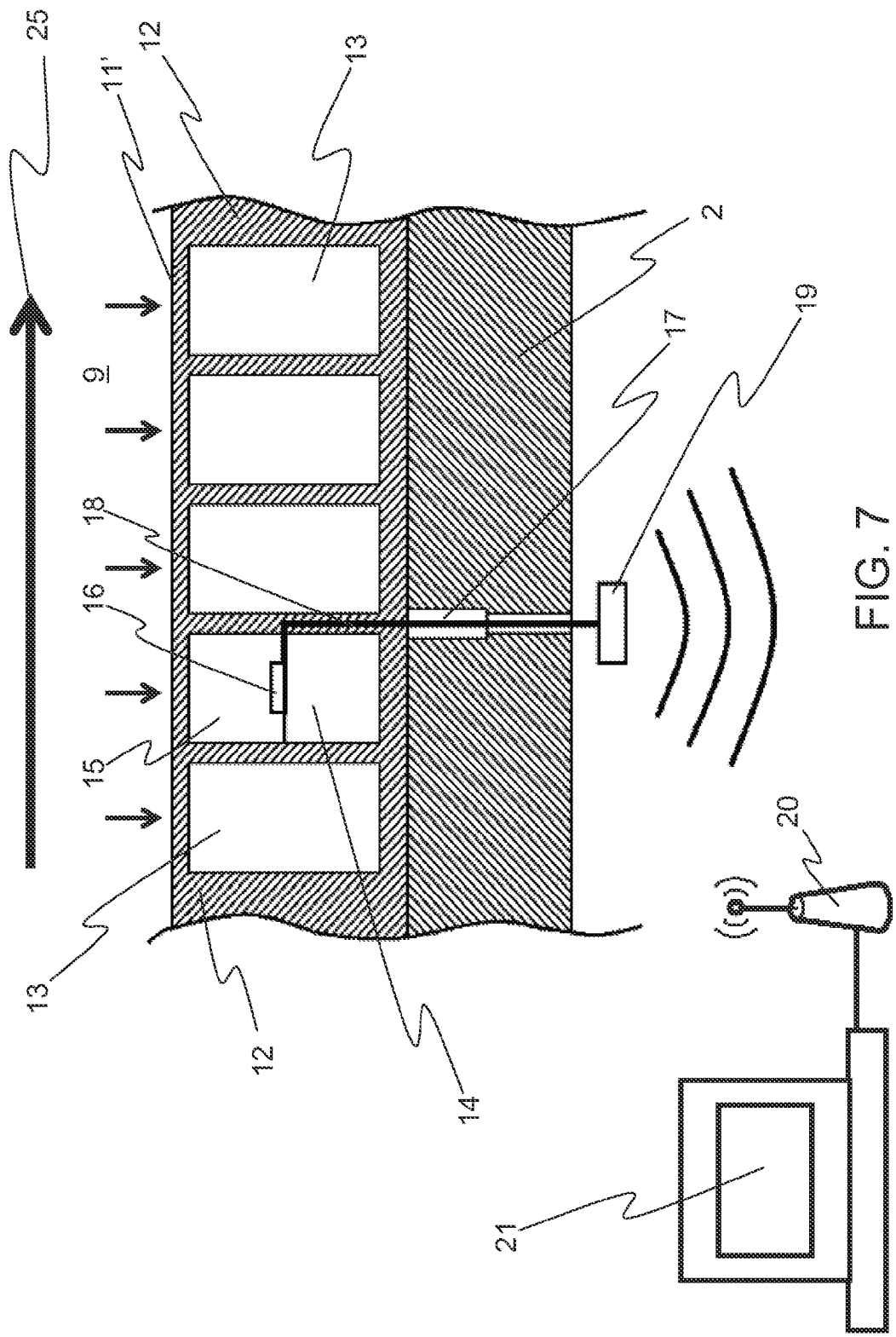
FIG. 7 shows a schematic view of the arrangement and the components of the measuring system of the present invention.

FIG. 7 illustrates the operation of the system to monitor the flow of material (25) passing through the discharge cone (9).

The flow of material (25) compresses the surface (11') of the rubber (12) which makes up the discharge cone (9). One of the inserts (13) in said discharge cone (9), has a strain gage (16) located in between the upper and lower halves (14, 15). The stress transmitted to the surface (11) by the flow of the material (25) compresses the insert (13), and consequently, the strain gage (16). As the electric resistance changes in the strain gage (16) due to the compression, also varies the output power transmitted by the wiring (18) crossing the chamber (17) toward one of the screws (6) in the cover (2), where the wireless transmitter is placed (19).

The signal issued by the wireless transmitter (19) is received by the wireless receiver (20) and is processed by a signal reader (21), normally a PC with a signal reading software. The processed signal provides the measurement of the flow of material (25) passing through the discharge cone (9).

Figure 8:
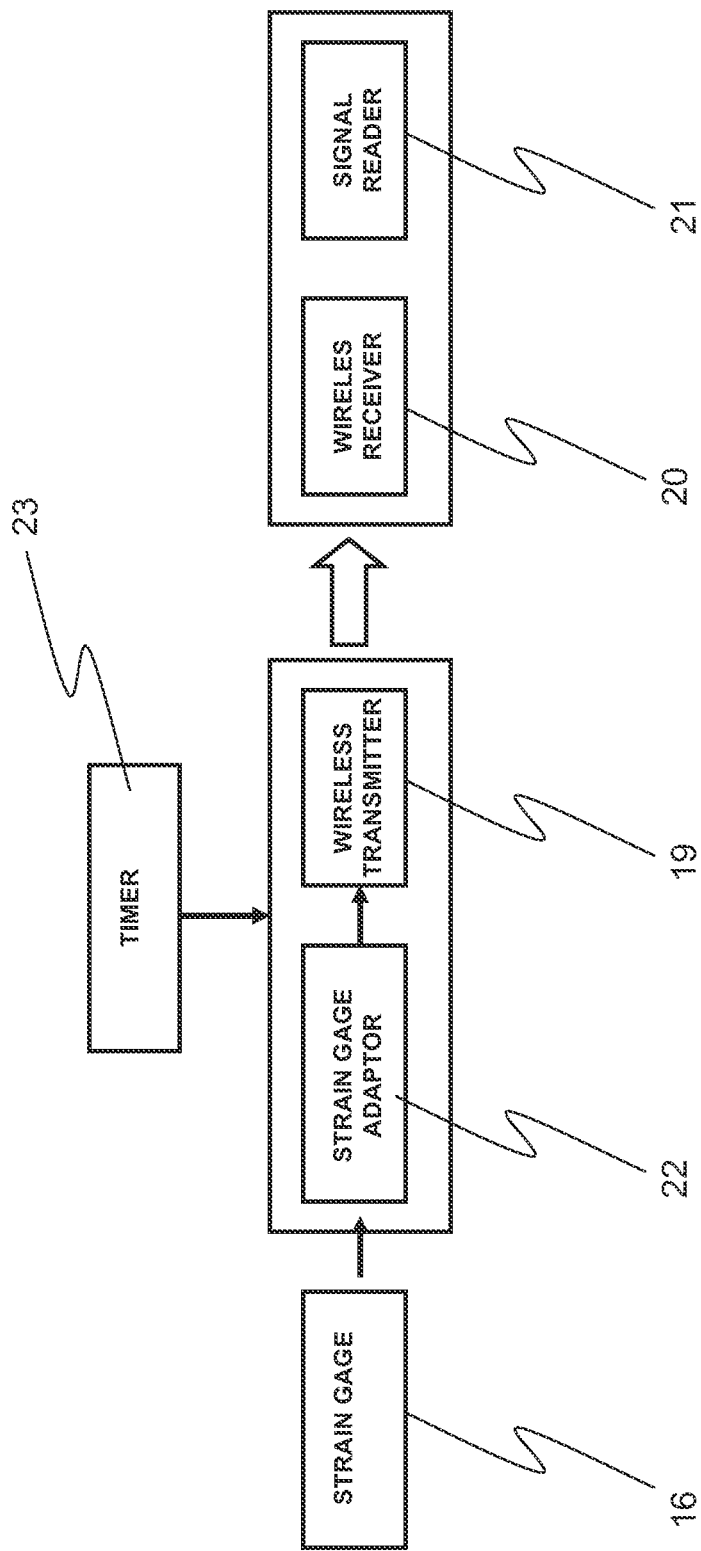
FIG. 8 shows a block diagram of the measuring system of the present invention.

The modules of the monitoring system in the present invention, as shown in FIG. 8, wherein a strain gage (16) is connected to the strain gage adaptor unit (22) and to a wireless transmitter (19), both of which are connected to a timer (23). The wireless transmitter (19) issues a signal which is received by the wireless receiver (20) connected to a signal reader (21), normally a PC with a signal reading software. The function of the timer (23) is to help defining the time interval to issue the signals from the transmitter as per the operational needs of the mill, whereas such can be 100% of the time when the mill is in operation or based on time intervals specified in defined periods (one hour during the day, two hours in a day in different moments, etc.) The wireless receiver (20) can be placed in a safe area outside the mill at a distance of approximately 20 meters from the mill.

FIG. 9 shows a schematic perspective of the material (25) passing through the discharge cone (9) after the pulp lifters.

The system is calibrated and correlated as to help the strain gage (16) feed data of cubic meters per hour (m3/hora), as the cross-section area where the material is passing through is known.

Although embodiments of the invention have been shown and described, it is to be understood that various modifications, substitutions, and rearrangements of parts, components, equipment and method (process) steps as well as other uses for the invention, can be made by those skilled in the art without departing from the novel spirit and scope of the invention.

The invention claimed is:

1. A system to measure in real time the flow of material passing through pulp lifters and a discharge cone of an autogenous or semi-autogenous mill for mineral grinding, and said mill comprises a cylinder or shell, a cover, an exit or discharge port, and an opening for the intake of the material, wherein in the discharge port a grate is located thereof with slots for the screening of the material in such a way that when the material reaches the appropriate size, passes through said slots heading toward the pulp lifter, passing through the discharge cone until reaching the discharge port, wherein walls of both pulp lifter and discharge cone, or part of the walls, are made of rubber with a plurality of inserts, wherein said system includes:
  at least one strain gage placed on at least one insert of said plurality of inserts is placed in the discharge cone, and said strain gage is connected to one half of an adaptor unit of the strain gage;
  a wireless transmitter connected to said adaptor unit of the strain gage, and said transmitter outputs the signal from said strain gage;
  a wireless receiver for receiving the signal from the wireless transmitter (19); and
  a signal reader connected to said wireless receiver to process signals received from the wireless transmitter.

2. The system to measure the flow of material as indicated in claim 1, wherein at least one insert with at least one strain gage is placed on a surface of an external covering layer of the discharge cone.

3. The system to measure the flow of material as indicated in claim 1, wherein at least one insert with at least one strain gage is placed on a surface of an internal covering layer of the discharge cone.

4. The system to measure the flow of material as indicated in claim 1, wherein at least two inserts with at least two strain gages are placed on an external covering layer and on a surface of an internal covering layer of the discharge cone.

5. The system to measure the flow of material as indicated in claim 1, wherein the insert with said strain gage is placed on a surface of an internal covering layer of the pulp lifter.

6. The system to measure the flow of material as indicated in claim 1, wherein at least two inserts with at least three strain gages are placed on an external covering layer and on a surface of an internal covering layer of the discharge cone, as well as on the cover of the pulp lifter.

7. The system to measure the flow of material set forth in claim 1 wherein said strain gage, said adaptor unit, and said wireless transmitter are all connected to a timer which defines a time interval to issue the signals from the transmitter.

8. The system as set forth in claim 1, wherein said signal reader is a PC with signal reader software.

9. The system as set forth in claim 1, wherein the signal from said strain gage is wired through a wiring facing towards a screw of said cover.

10. The system as set forth in claim 1, wherein said wireless receiver is placed in any safe area outside the mill, at a distance of approximately 20 meters from the mill.

11. The system as set forth in claim 1, wherein said strain gage is located in a ceramic insert cross-sectioned in the middle point thus generating a lower half and an upper half, and said strain gage is placed on a surface created by the cross-section on one of the halves.

12. The system as set forth in claim 11, wherein said ceramic insert with the strain gage is sealed in its two halve, thus creating one single unit that is placed in the discharge cone.

13. The system as set forth in claim 11, wherein said ceramic insert with the strain gage is sealed in its two halves, thus creating one single unit that is placed in the pulp lifter.

14. A method to measure the flow of material passing through a pulp lifter and a discharge cone of an autogenous or semi-autogenous mill for mineral grinding, and said mill comprises a cylinder or shell, a cover, an exit or discharge port, and an opening for receiving the material, wherein in the discharge port a grate is located thereof with slots for the screening of the material in such a way that when the material reaches the appropriate size, passes through said slots heading toward the pulp lifter, passing through the discharge cone until reaching the discharge port, wherein walls of both the pulp lifter and discharge cone, are made of rubber and the rubber holds ceramic inserts, wherein said method includes the following steps:
  passing through of the flow of material through said pulp lifter and/or the discharge cone,
  compressing the surface of the rubber forming the pulp lifter and/or the discharge cone, wherein one of the ceramic inserts, pulp lifter and/or discharge cone, has a strain gage, and wherein stress transmitted by the flow of material compresses the ceramic insert and therefore, the strain gage;
  capturing a signal comprising a variation in the electric resistance in the strain gage due to compression;
  conducting the captured signal by wiring crossing a chamber towards a screw in the cover where a wireless transmitter is placed;
  receiving the signal in a wireless receiver from the wireless transmitter; and
  processing the signal received from the wireless receiver in a signal reader.

* * * * *